US010963912B2

(12) United States Patent
Zhou

(10) Patent No.: US 10,963,912 B2
(45) Date of Patent: Mar. 30, 2021

(54) METHOD AND SYSTEM FOR FILTERING GOODS REVIEW INFORMATION

(71) Applicants: BEIJING JINGDONG SHANGKE INFORMATION TECHNOLOGY CO, LTD., Beijing (CN); BEIJING JINGDONG CENTURY TRADING CO., LTD., Beijing (CN)

(72) Inventor: Dong Zhou, Beijing (CN)

(73) Assignees: BEIJING JINGDONG SHANGKE INFORMATION CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 745 days.

(21) Appl. No.: 15/307,430

(22) PCT Filed: Apr. 29, 2015

(86) PCT No.: PCT/CN2015/077848
§ 371 (c)(1),
(2) Date: Oct. 28, 2016

(87) PCT Pub. No.: WO2015/165408
PCT Pub. Date: Nov. 5, 2015

(65) Prior Publication Data
US 2017/0053213 A1    Feb. 23, 2017

(30) Foreign Application Priority Data
Apr. 29, 2014 (CN) .......................... 201410178839.4

(51) Int. Cl.
*G06Q 30/02* (2012.01)
*G06N 20/00* (2019.01)
(Continued)

(52) U.S. Cl.
CPC ......... *G06Q 30/0248* (2013.01); *G06F 16/35* (2019.01); *G06F 16/9535* (2019.01);
(Continued)

(58) Field of Classification Search
CPC ............ G06Q 30/0282; H04L 63/0227; G06N 20/00; G06N 3/08; G06F 40/20; G06F 16/955; G06F 40/205
See application file for complete search history.

(56) References Cited

U.S. PATENT DOCUMENTS 6,161,130 A * 12/2000 Horvitz ................ G06K 9/6269
709/206
7,882,192 B2 * 2/2011 Rajan ..................... H04L 51/12
348/153

(Continued)

FOREIGN PATENT DOCUMENTS

| CN | 101005648 A | 7/2007 |
|---|---|---|
| CN | 101132590 A | 2/2008 |

(Continued)

OTHER PUBLICATIONS

P. Pantel and D. Lin, "SpamCop: A Spam Classification & Organization Program," 1998, AAAI, AAAI Technical Report WS-98-05, pp. 95-98 (Year: 1998).*

(Continued)

*Primary Examiner* — Miranda M Huang
*Assistant Examiner* — Catherine F Lee
(74) *Attorney, Agent, or Firm* — Michael Best & Friedrich LLP

(57) ABSTRACT

The present invention discloses a method and a system for filtering goods review information. The method comprises: acquiring a plurality of predetermined advertisement spam samples, each advertisement spam sample comprising a review text and a user identification; establishing an adver- (Continued)

tisement spam user identification library comprising the user identifications of the plurality of advertisement spam samples; and acquiring a new review comprising a user identification and a review text, and determining the new review as an advertisement spam review if the user identification of the new review is included in the advertisement spam user identification library. An advertisement spam review is identified according to a user identification that publishes the review in the present invention. A new method is provided in the technical field of identifying an advertisement spam review for solving the problem that messy spam reviews are difficult to identify.

3 Claims, 3 Drawing Sheets

(51) Int. Cl.
  *G06F 16/35* (2019.01)
  *G06F 16/9535* (2019.01)
  *H04W 4/12* (2009.01)
(52) U.S. Cl.
  CPC ......... *G06N 20/00* (2019.01); *G06Q 30/0241* (2013.01); *H04W 4/12* (2013.01)

(56) References Cited

U.S. PATENT DOCUMENTS

| | | | |
|---|---|---|---|
| 2004/0003283 A1* | 1/2004 | Goodman | G06Q 10/107 726/30 |
| 2005/0076084 A1* | 4/2005 | Loughmiller | G06Q 10/107 709/206 |
| 2014/0304814 A1* | 10/2014 | Ott | G06F 17/274 726/22 |

FOREIGN PATENT DOCUMENTS

| | | |
|---|---|---|
| CN | 101815262 A | 8/2010 |
| CN | 103996130 A | 8/2014 |

OTHER PUBLICATIONS

Shams et al., "Classifying Spam Emails using Text and Readability Features," 2013, IEEE 13th International Conference on Data Mining, pp. 657-666 (Year: 2013).*

International Search Report with English translation and Written Opinion for Application No. PCT/CN2015/077848 dated Jul. 22, 2015 (10 pages).

* cited by examiner

METHOD AND SYSTEM FOR FILTERING GOODS REVIEW INFORMATION

CROSS-REFERENCE TO RELATED APPLICATIONS

This application is a national stage filing under 35 U.S.C. 371 of International Application No. PCT/CN2015/077848 filed Apr. 29, 2015, and claims the foreign priority benefits of Chinese Patent Application No. 201410178839.4 filed Apr. 29, 2014, which are incorporated by reference herein in their entireties.

TECHNICAL FIELD

The present invention relates to the technical field concerning goods reviews, in particular a method and a system for filtering goods review information.

BACKGROUND ART

With the rapid development of the electronic commerce, more people choose to purchase goods on line and submit reviews on them, generating a large amount of goods review information. All review information about a product will be shown as references for other users before purchase. However, some review information is generated by users for other purposes, or generated randomly, mainly in forms of advertisement reviews and messy spam reviews. Examples are provided as follows:

1. Advertisement reviews such as:

Example 1: The product is good, accords with the descriptions, and is of good quality. The product is worth its price. I like it very much, and it is exactly what I want. After buying it, I got to know that there is an internal time-limited access for the product, and the time-limited price is much cheaper. It is still the product sold in the shop (copy the link below and open it in the browser within the limited time) url.cn/XXXXX.

Sample 2: I am going to transfer the second-handed totally new Converse size 38). Please contact QQ XXXXXXXX if you need.

Sample 3: Please help promoting that you will get a discount if you buy in this preferential group for electronic commerce: XXXXXXXX. You can get various preferential policies for free. Online shoppers may follow it for saving as much as you can.

II. Spam reviews including scrambled text such as (shown using Chinese characters):

Sample 1: fdafasd32rg.

Sample 2: fadf I tya gag lol.

Sample 3: yggdfb am Is afd3tagz.

The aforesaid two kinds of reviews are not reviews about a product itself. Besides, these reviews serve the purpose of interfering with other users intending to purchase the product. So presentation of such reviews is meaningless and need be identified and filtered.

There exist mainly two kinds of technical solutions for advertisement spam identification, which are, respectively, an identifying and filtering method based on a manually established dictionary, and a machine learning classifying, identifying and filtering method based on statistics. The two methods are as follows:

(1) The identifying method based on a manually established dictionary: extracting a portion of sample review data, checking and determining manually, summarizing and extracting a series of keywords representing advertisement reviews to compile dictionaries; performing a boot check on a new review text using these dictionaries; if a review includes one or more keywords from the dictionaries, determining the review as an advertisement review. From the aforesaid examples, the following keywords are extracted: time-limited accesses, QQ numbers, please contact, preferential group, and the dictionary is compiled with these keywords. The method is mainly used for identifying and filtering advertisement reviews.

(2) The machine learning classifying and identifying method based on statistics: extracting a portion of sample review data manually, and marking these sample data as corpus; if a piece of review information belongs to advertisement or spam reviews, marking it with 1, otherwise marking it with 0. Upon completion of marking all the samples, using these data as a training set for text classification, and selecting a text classification algorithm, e.g., Naive Bayes Algorithm, Libsvm Classification Algorithm, etc. to construct a classifier, then classifying a new review text automatically; if it is classified into the category marked with 1, it means that the review belongs to advertisement or spam, otherwise it belongs to normal reviews. The filtering accuracy of the method is proportional to the amount of sample marking. That is, the greater the amount of marking is, the better the accuracy is.

Although the two existing technical solutions have significant effect on identifying and filtering advertisement or spam reviews, they have certain defects.

Concerning the first method, i.e., the filtering method based on a manually established dictionary, the method has relatively good effect on identifying advertisement reviews, but has the following main defects: (1). The establishment of the dictionary is totally depended on manpower, requiring manpower to observe a large amount of advertisement reviews. Besides, it is relatively subjective to extract typical advertisement keywords, causing the establishment of the dictionary to be inaccurate, incomplete and unscientific, and thereby leading to an uncontrollable accuracy and recall rate. If the established dictionary includes some keywords that are not sufficiently representative of an advertisement, a relatively low accuracy of identification would be caused. If the number of the representative keywords included in the established dictionary is insufficient, a relatively low recall rate would be caused. That is, there could be a lot of new advertisement reviews in reality, but the number of those identified is relatively small. (2). It is impossible to identify and filter a spam review, because the main form of a spam review is an unpredictable linguistically irregular text. For example, in the three samples of the aforesaid spam reviews, representative characteristic keywords are not obvious, so it is difficult to establish a set of dictionaries dedicated for identifying spam reviews.

As for the second method, i.e., the machine learning classifying and identifying method based on statistics, it turns identifying and filtering advertisement spam reviews into a problem of classifying two categories. Compared with the first method, the method not only has relatively significant effect on identifying advertisement reviews, but also has certain effect on identifying spam reviews. But the method mainly has the following defects: (1). There has to be sufficient markings on sample corpus used as a training set, requiring a large amount of manpower. (2) Although the method has certain effect on identifying spam reviews, the accuracy is relatively low for the following reasons: a spam review is irregular linguistically, and its word characteristic after word segmentation is relatively ordinary and not typical during the preprocessing stage. Besides, these words are generated randomly, and have no definite meanings linguistically. So the identification rate of spam reviews is relatively low.

SUMMARY OF THE INVENTION

Concerning the above, it is necessary to provide a method and a system for filtering goods review information to address the technical problem of inaccurate classification of advertisement spam reviews in the prior art.

A method for filtering goods review information, comprising:
  acquiring a plurality of predetermined advertisement spam samples, each advertisement spam sample comprising a review text and a user identification;
  establishing an advertisement spam user identification library comprising user identifications of the plurality of advertisement spam samples; and
  acquiring a new review comprising a user identification and a review text, and determining the new review as an advertisement spam review if the user identification of the new review is included in the advertisement spam user identification library.

A system for filtering goods review information, comprising:
  a sample acquiring module for acquiring a plurality of predetermined advertisement spam samples, each advertisement spam sample comprising a review text and a user identification;
  an identification library establishing module for establishing an advertisement spam user identification library comprising user identifications of the plurality of advertisement spam samples; and
  a new review determining module for acquiring a new review comprising a user identification and a review text, and determining the new review as an advertisement spam review if the user identification of the new review is included in the advertisement spam user identification library.

The present invention identifies an advertisement spam review using a user identification that publishes the review, and provides a totally new method in the field of identifying an advertisement Spain review. It solves the problem that is it difficult to identify messy spam reviews, and leads to significant improvement in the accuracy and recall rate of identifying advertisement spam reviews. This plays a key role in promoting accurate and valid identification and filtering of advertisement spam goods reviews in the field of electronic commerce.

DETAILED DESCRIPTION OF THE INVENTION

The present invention is further depicted in detail with reference to the drawings and the specific embodiments below.

Figure 1:
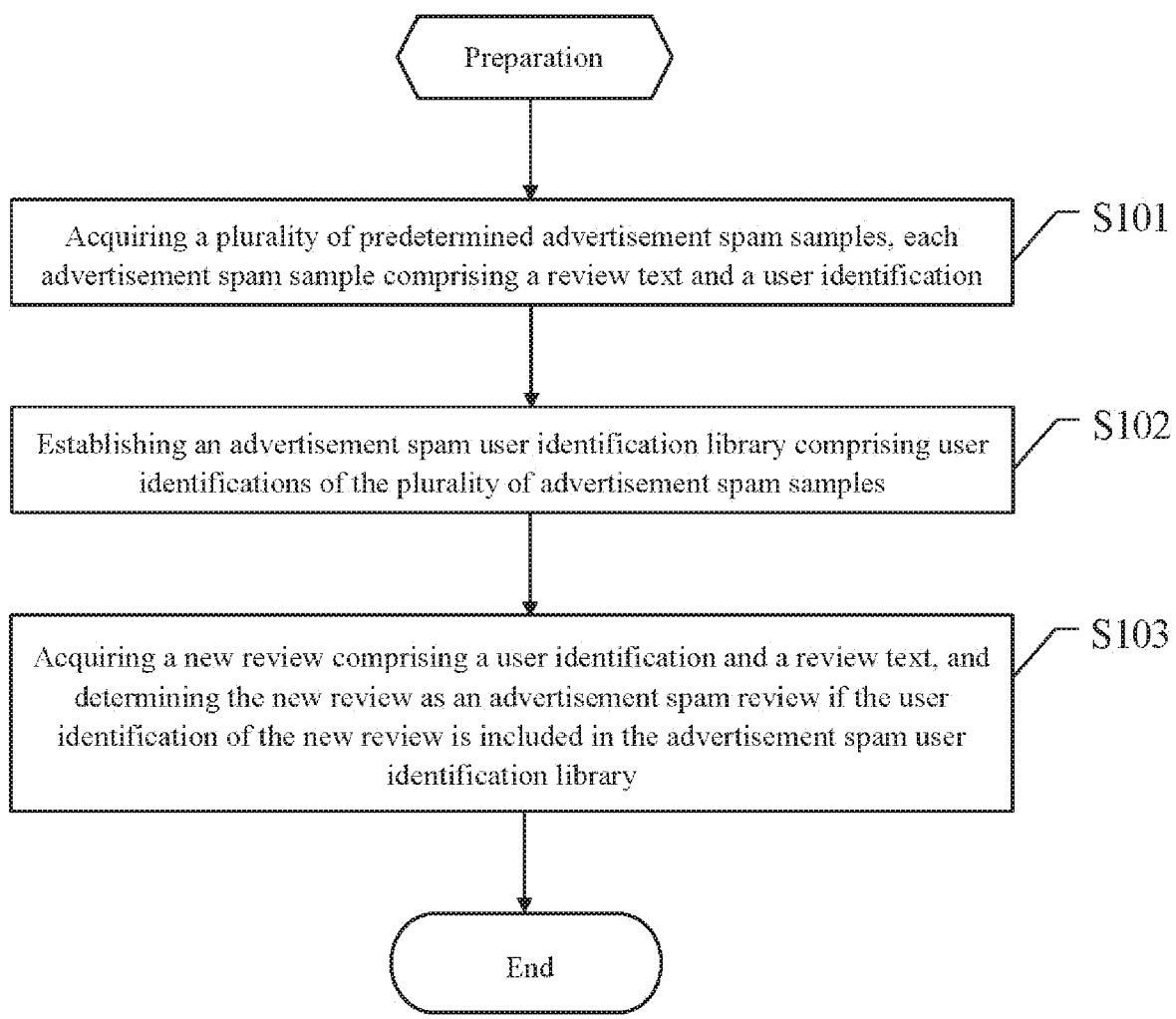
FIG. 1 is a flow chart of a method for filtering goods review information according to the present invention.

FIG. 1 illustrates the flow chart of a method for filtering goods review information according to the present invention, comprising:
  step S101 of acquiring a plurality of predetermined advertisement spam samples, each advertisement spam sample comprising a review text and a user identification;
  step S102 of establishing an advertisement spam user identification library comprising user identifications of the plurality of advertisement spam samples; and
  step S103 of acquiring a new review comprising a user identification and a review text, and determining the new review as an advertisement spam review if the user identification of the new review is included in the advertisement span user identification library.

The present invention identifies an advertisement review and a spam review using a user-review relationship. Definitely a goods review belongs to a user, so different users can be identified using user identifications. If a user has ever posted an advertisement review or a spam review, it is more likely for he or she to post again than those who have never posted. Accordingly, at step S101 of the present invention, an advertisement spam user identification library is composed of the user identifications of advertisement spam samples such that, when the user identification from the library posts a review again, the review can be determined rapidly as an advertisement spam review.

In one embodiment, the method further comprises:
  establishing a collection of advertisement spam reviews comprising the review texts of the plurality of advertisement spam samples, training a text classifier using the collection of advertisement spam reviews as a training set for the text classifier, and performing, by the text classifier, classification on an input review text to determine it as an advertisement spam review text or a non-advertisement spam review text;
  after acquiring the new review, if the user identification of the new review is not included in the advertisement spam user identification library, performing, by the text classifier, classification on the review text of the new review: if the text classifier classifies the review text of the new review as an advertisement spam review text, determining the new review as an advertisement spam review, adding the user identification of the new review to the advertisement spam user identification library, adding the review text of the new review to the collection of advertisement spam reviews, and retraining the text classifier.

In the embodiment, a text classifier is added. A review text of an advertisement spam sample is used as a training set for the text classifier. When the user identification of a new review is not included in the advertisement spam user identification library, the text classifier is used for classifying and determining to avoid missing identification.

In another embodiment, the method further comprises:
  extracting an advertisement keyword from the collection of advertisement spam reviews to compile an advertisement dictionary;
  if the text classifier classifies the new review as a non-advertisement spam review text, filtering the review text of the new review with the advertisement dictionary; if the review text of the new review includes a number of advertisement keywords from the advertisement dictionary that is greater than or equal to a predetermined advertisement threshold, determining the new review as an advertisement spam review, and adding the user identification of the new review to the advertisement spam user identification library, adding the review text of the new review to the collection of advertisement spam reviews, and retraining the text classifier.

In the embodiment, the method adds the steps of extracting advertisement keywords from the collection of advertisement spam reviews to compile an advertisement dictionary; and if the text classifier classifies the new review as a non-advertisement spam review text, filtering the review text of the new review with the advertisement dictionary to avoid missing identification.

In another embodiment, the method further comprises:

if the review text of the new review includes a number of advertisement keywords from the advertisement dictionary that is less than the predetermined advertisement threshold, performing spam review text analysis on the review text: if a result of the performing spam review text analysis on the review text is a spam review text, determining the new review as an advertisement spam review, adding the user identification of the new review to the advertisement spam user identification library, adding the review text of the new review to the collection of advertisement spam reviews, and retraining the text classifier.

In the embodiment, the method adds further analysis on the spam review text.

Preferably, the spam review text analysis comprises:

calculating a single-character ratio of the review text after word segmentation, and determining the review text as a spam review text if the single-character ratio is greater than or equal to a predetermined ratio threshold.

Figure 2:
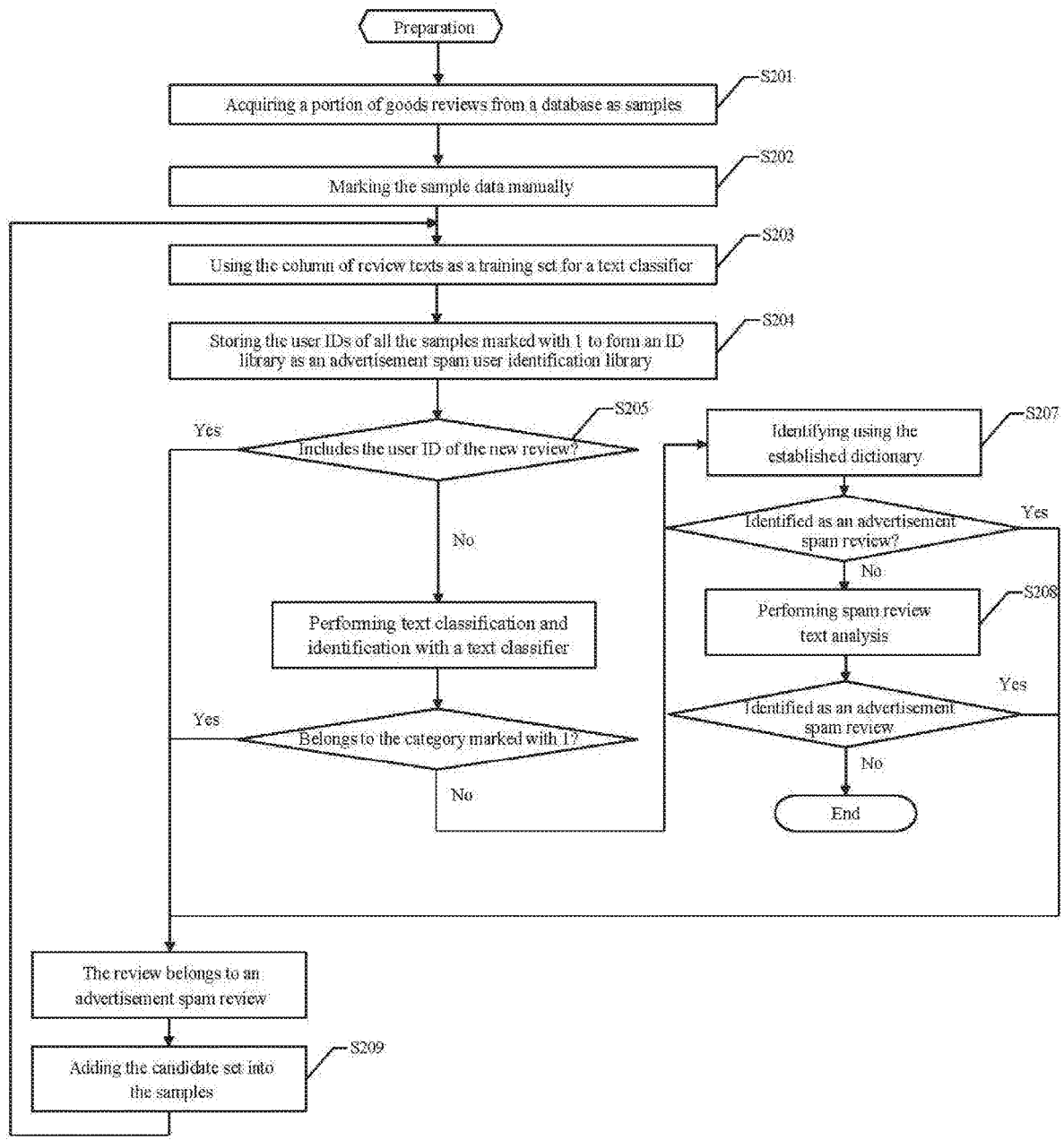
FIG. 2 is a flow chart of an embodiment according to the present invention.

FIG. 2 illustrates a flow chart of another embodiment of the present invention. The method comprises:

step S201 of acquiring a portion of goods reviews from a database as samples, the sample data consisting of two columns, i.e., user Ms and review texts;

step S202 of marking the sample data manually by marking them with 1 if they belong to advertisement reviews, or otherwise marking them with 0, and meanwhile establishing an advertisement dictionary;

step S203 of using the column of review texts as a training set for the text classifier;

step S204 of storing the user IDs of all the samples marked with 1 to form an ID library as an advertisement spam user identification library;

step S205 of using a new review as a candidate set of advertisement spam reviews if the user ID of the review is included in the advertisement spam user identification library, determining preliminarily that the review belongs to advertisement spam reviews, and delivering it for manual processing to proceed with step S209;

step S206 of using corpus marked at step S203 as a training set, performing a text classification and identification with a text classifier, using the review as a candidate set of advertisement spam reviews if it belongs to the category marked with 1, determining preliminarily that the review belongs to advertisement spam reviews, and delivering it for manual processing to proceed with step S209, and proceed with step S207 if it belongs to the category marked with 0;

step S207 of identifying using the established dictionary, using the review as a candidate set of advertisement spam reviews if it is identified as an advertisement spam review, and delivering it for manual processing to proceed with step S209, or otherwise proceed with step S208;

step S208 of performing spam review text analysis, and using the review as a candidate set of advertisement spam reviews if it is identified as an advertisement spam review, and delivering it for manual processing; and step S209 of adding the candidate set to the samples and turning to step S204 to mark it.

The spam review text analysis is specifically as follows:

A spam review is identified by calculating a single-character ratio of the review text after word segmentation. Usually a spam review is a review written by a user by clicking a keyboard randomly, e.g., the aforementioned example of a spam review "我 吐兔兔继续找我下咯我". As can be seen, the words consisting of such review text are mostly single-character words. For example, in the example "我\吐\兔\兔\继续\我 我\下\咯\我" after word segmentation, there are 9 words in total, in which there are 7 single-character words with a ratio of 77.78% as calculated. Assuming that there are n number of words in total in a review text and m number of single-character words after word segmentation, the formula for calculating the single character to word ratio f is as follows:

$$f=m/n \ (m \leq n)$$

Assuming that the threshold for meeting a criterion of a spam review is t (0≤t≤1), if f≥t, the system will determine the review as a spam review, wherein t may be tested manually and set flexibly.

Figure 3:
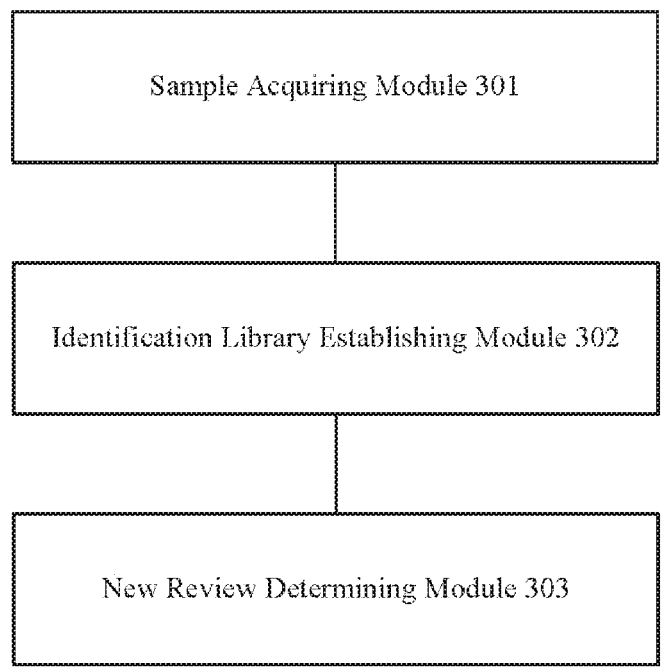
FIG. 3 is a structural module diagram of a system for filtering goods review information according to the present invention.

FIG. 3 illustrates a structural module diagram of a system for filtering goods review information according to the present invention. The system comprises:

a sample acquiring module 301 for acquiring a plurality of predetermined advertisement spam samples, each advertisement spam sample comprising a review text and a user identification;

an identification library establishing module 302 for establishing an advertisement spam user identification library comprising user identifications of the plurality of advertisement spam samples;

a new review determining module 303 for acquiring a new review comprising a user identification and a review text, and determining the new review as an advertisement spam review if the user identification of the new review is included in the advertisement spam user identification library.

In one embodiment, the system further comprising:

establishing a collection of advertisement spam reviews comprising the review texts of the plurality of advertisement spam samples, training a text classifier using the collection of advertisement spam reviews as a training set for the text classifier, and performing, by the text classifier, classification on an input review text to determine it as an advertisement spam review text or a non-advertisement spam review text;

after acquiring the new review, if the user identification of the new review is not included in the advertisement spam user identification library, performing, by the text classifier, classification on the review text of the new review: if the text classifier classifies the review text of the new review as an advertisement spam review text, determining the new review as an advertisement spam review, adding the user identification of the new review to the advertisement spam user identification library, adding the review text of the new review to the collection of advertisement spam reviews, and retraining the text classifier.

In an embodiment, the system further comprises:

extracting advertisement keywords from the collection of advertisement spam reviews to compile an advertisement dictionary;

if the text classifier classifies the new review as a non-advertisement spam review text, filtering the review text of the new review with the advertisement dictionary; if the review text of the new review includes a number of advertisement keywords from the advertisement dictionary that is greater than or equal to a predetermined advertisement threshold, determining the new review as an advertisement spam review, and adding the user identification of the new review to the advertisement spam user identification library, adding the review text of the new review to the collection of advertisement spam reviews, and retraining the text classifier.

In one embodiment, the system further comprising:

if the review text of the new review includes a number of advertisement keywords from the advertisement dictionary that is less than the predetermined advertisement threshold, performing spam review text analysis on the review text: if a result of the performing spam review text analysis on the review text is a spam review text, determining the new review as an advertisement spam review, adding the user identification of the new review to the advertisement spam user identification library, adding the review text of the new review to the collection of advertisement spam reviews, and retraining the text classifier.

In one embodiment, the performing spam review text analysis comprises:

calculating a single-character ratio of the review text after word segmentation, and determining the review text as a spam review text if the single character ratio is greater than or equal to a predetermined ratio threshold.

The aforesaid embodiments only illustrate several modes of implementing the present invention, and are depicted relatively specifically and in more details, but they cannot be understood as limitations of the patent scope of the present invention. Note that for those ordinary skilled in the art, without deviating from the concept of the present invention, they may make several alterations and improvement. These all belong to the protection scope of the present invention. Therefore, the protection scope of the present invention shall be determined based on the attached claims.

The invention claimed is:

1. A method for filtering goods review information, comprising:

acquiring a plurality of predetermined advertisement spam samples, each advertisement spam sample comprising a review text and a user identification;

establishing an advertisement spam user identification library comprising user identifications of the plurality of advertisement spam samples;

establishing a collection of advertisement spam reviews comprising the review texts of the plurality of advertisement spam samples;

training a text classifier using the collection of advertisement spam reviews as a training set for the text classifier;

extracting advertisement keywords from the collection of advertisement spam reviews to compile an advertisement dictionary;

acquiring a new review comprising a user identification and a review text, and determining the new review as advertisement spam review when the user identification of the new review is included in the advertisement spam user identification library; and wherein, after acquiring the new review, when the user identification of the new review is not included in the advertisement spam user identification library, performing by the text classifier, classification on the review text of the new review:

when the text classifier classifies the review text of the new review as advertisement spam review text, determining the new review as advertisement spam review, adding the user identification of the new review to the advertisement spam user identification library, adding the review text of the new review to the collection of advertisement spam reviews, and retraining the text classifier;

when the text classifier classifies the new review as non-advertisement spam review text, filtering the review text of the new review with the advertisement dictionary;

when the review text of the new review includes a number of the advertisement keywords from the advertisement dictionary that is greater than or equal to a predetermined advertisement threshold, determining the new review as advertisement spam review, adding the user identification of the new review to the advertisement spam user identification library, adding the review text of the new review to the collection of advertisement spam reviews, and retraining the text classifier.

2. The method for filtering goods review information according to claim 1, further comprising:

when the review text of the new review includes a number of the advertisement keywords from the advertisement dictionary that is less than the predetermined advertisement threshold, performing spam review text analysis on the review text, and, when a result of the spam review text analysis on the review text determines the review text as spam review text, determining the new review as advertisement spam review, adding the user identification of the new review to the advertisement spam user identification library, adding the review text of the new review to the collection of advertisement spam reviews, and retraining the text classifier.

3. The method for filtering goods review information according to claim 2, wherein the step of performing spam review text analysis comprises:

calculating a single-character ratio of the review text after word segmentation, and determining the review text as spam review text when the single-character ratio is greater than or equal to a predetermined ratio threshold.

* * * * *